June 12, 1962 W. KADEN 3,038,373
PHOTOGRAPHIC PROJECTORS
Filed March 28, 1958 3 Sheets-Sheet 1

INVENTOR.
Willy Kaden
BY
Michael S. Striker
Attorney

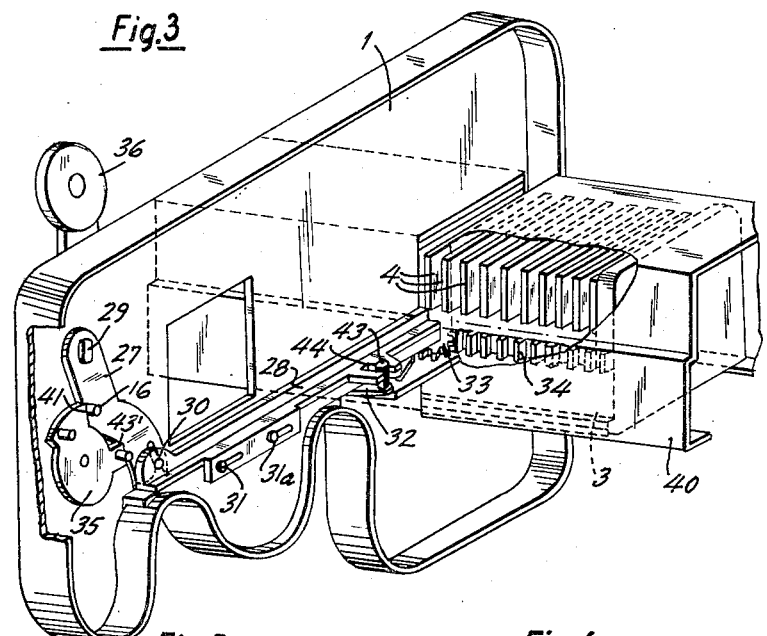
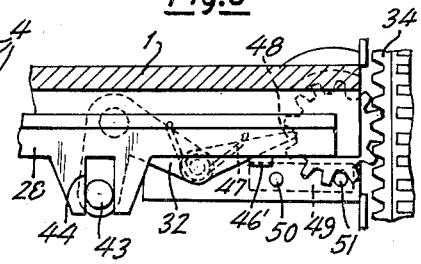
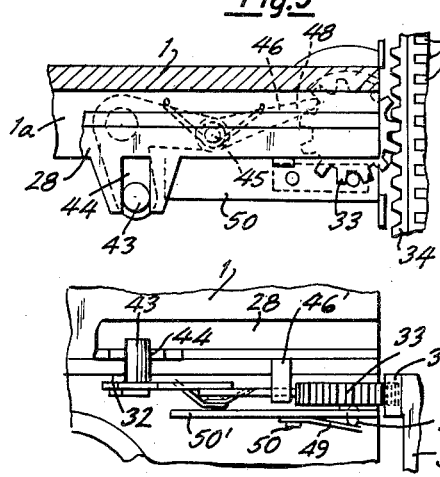
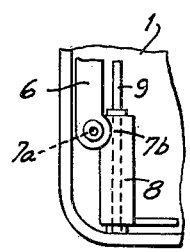

June 12, 1962 W. KADEN 3,038,373
PHOTOGRAPHIC PROJECTORS
Filed March 28, 1958 3 Sheets-Sheet 3
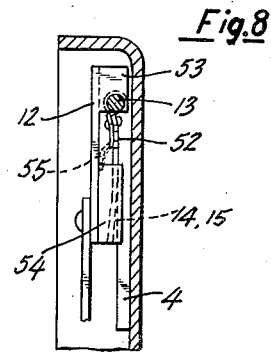
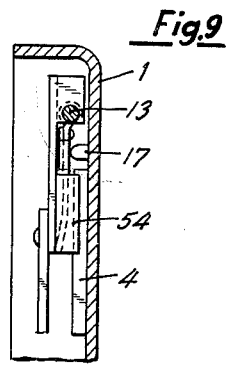
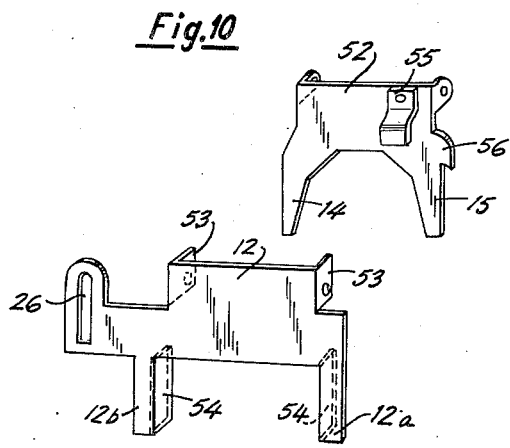
INVENTOR.
Willy Kaden
BY
Michael S. Striker
Attorney United States Patent Office 3,038,373
Patented June 12, 1962

3,038,373
PHOTOGRAPHIC PROJECTORS
Willy Kaden, Munich, Germany, assignor to Agfa Aktiengesellschaft, Leverkusen-Bayerwerk, Germany
Filed Mar. 28, 1958, Ser. No. 724,739
Claims priority, application Germany Mar. 29, 1957
6 Claims. (Cl. 88—28)

The present invention relates to photographic projectors.

Conventional projectors have disadvantages. For example, with certain types of magazines, great care must be taken that the pictures do not fall from the magazine while the magazine is being carried to and from the projector. Also, with other types of projectors and magazines, as where the magazine is beneath the aperture through which the projection takes place, it is difficult to see inscriptions on the pictures which are to be projected.

One object of the present invention is to provide in a photographic projector of the above type a structure which is capable of moving pictures from a magazine to a picture-projecting position and then back to the magazine while at the same time enabling the magazine to be so constructed that the pictures cannot easily fall therefrom and also making it possible to see very easily inscriptions on the pictures.

Another object of the present invention is to provide a structure of the above type which is capable of being attached to a projector so as to be capable of being used therewith.

A further object of the present invention is to provide a structure of the above type which is extremely simple to operate and in which a plurality of operations are compelled to take place in a predetermined sequence.

It is also an object of the present invention to provide structure capable of accomplishing all of the above objects and at the same time be made up of simple and ruggedly constructed elements which are very reliable in operation.

With the above objects in view, the present invention includes in a photographic projector a support means and a guide means carried by the support means for guiding a magazine for longitudinal movement. In accordance with the present invention the support means carries a means which cooperates with the magazine for moving a picture therefrom in a first direction, and then for moving the picture in a second direction different from the first direction to a picture-projecting position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
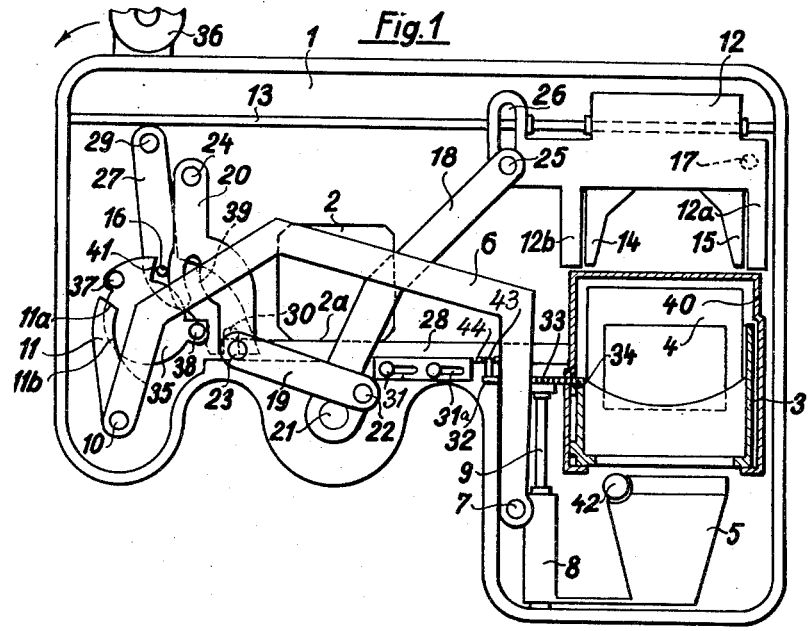
FIGURE 1 is an elevational view of a structure according to the present invention.

FIG. 3 perspectively illustrates the structure for advancing a magazine;

FIG. 4 is a fragmentary elevational view of a pinion and rack arrangement for advancing the magazine as well as structure for turning the pinion;

FIG. 5 is a plan view of a structure of FIG. 4;

FIG. 6 is a plan view of the structure of FIG. 4 showing the parts in a position different from FIG. 5;

FIG. 7 is a fragmentary elevational view of the structure of FIG. 1 for raising a picture from the magazine;

FIG. 8 is a fragmentary sectional side elevational view showing the structure for transporting a picture from the magazine to a projecting position;

FIG. 9 shows the position which the parts of FIG. 8 take for releasing a picture to the magazine and for receiving a picture from the magazine; and FIG. 10 is an exploded perspective view showing the components of the structure of FIGS. 8 and 9.

Referring now to FIG. 1, there is shown therein a support means in the form of a base plate 1 provided with the window 2 through which light rays are directed for projecting onto a suitable screen the image of a transparency or other form of picture located at a projecting position where the picture to be projected extends across the window 2. This support means or base plate 1 carries a guide means 40 which serves as a guide means for a magazine 3, this magazine 3 being guided by the guide means 40 for longitudinal movement in a direction normal to the plane of FIG. 1, and the magazine 3 carries a series of transparencies 4 which form the pictures which are to be projected.

A suitable moving means constructed in accordance with the present invention is carried by the support means 1 and cooperates with the magazine 3 which is guided by the guide means 40 for moving a picture 4 first upwardly out of the magazine and then to the left to a picture-projecting position. This means includes a raising means 5 which raises a picture upwardly out of the magazine, and a moving means 12 which moves the raised picture to the left to the window 2.

Figure 2:
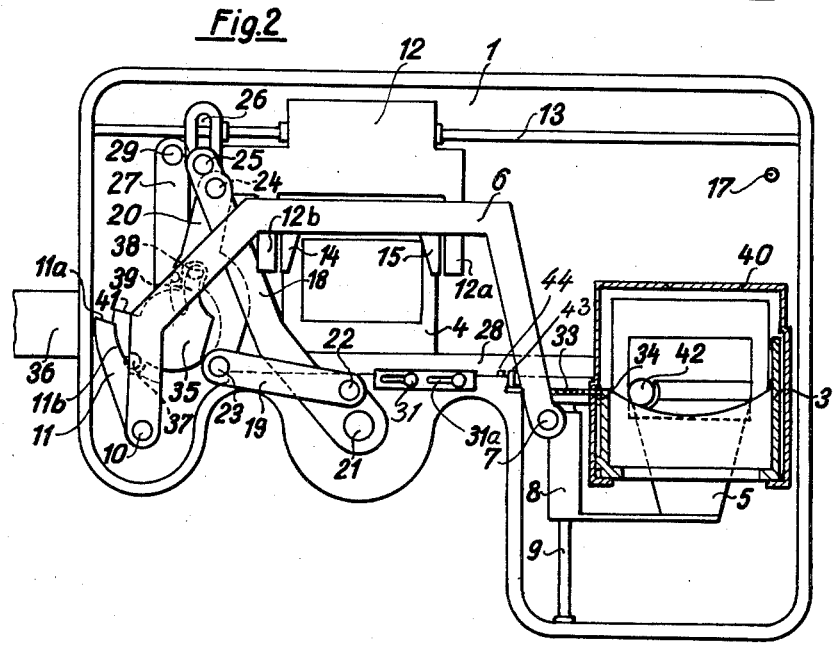
FIGURE 2 shows the structure of FIGURE 1 in a different position.

The raising means 5 is located beneath the guide means 40 and is movable from the bottom position of FIG. 1 upwardly to the upper position shown in FIG. 2 where the raising means locates the picture with which it cooperates at an elevation where the lower part of the picture is at the same elevation as the lower part 2a of the projecting aperture 2.

A linkage 6 is connected through a pin and slot connection 7 with a carriage 8 which carries the raising means 5 for raising the carriage 8 and thus raising the raising means 5, and the carriage 8 is guided for sliding movement up and down an elongated bar 9 which is fixedly carried by the support means 1. The end of the linkage 6 which is distant from the carriage 8 is turnable about a stationary pin 10 which is carried by the support means 1, and a cam 11 is fixedly connected with the linkage 6 for turning movement together with the latter about the pin 10.

The moving means 12 which moves the raised picture to the picture-projecting position is guided for horizontal movement by a bar 13 carried by the plate 1, and this moving means 12 has a pair of downwardly directed side arms 12a and 12b provided with guides which cooperate with the raised picture for guiding the latter to an operative position with respect to the moving means 12 so that the latter will move the picture in a manner described below. This moving means includes a spring means in the form of a pair of leaf springs 14 and 15 forming part of a frame parallel to the plate 1 and located between the arms 12a and 12b, and this frame which is provided with the pair of leaf springs 14 and 15 is so arranged that the leaf springs can press against the edges of the picture 4 to retain the latter for joint movement with the moving means 12. The frame which is provided with the leaf springs 14 and 15 is movably connected with the rest of the moving means 12 in such a way that when the moving means 12 moves from the position of FIG. 2 to the position of FIG. 1, just before the means 12 reached the position of FIG. 1 a pin 17 carried by the support means 1 engages the leaf spring carrying frame to act on the latter to move the leaf springs 14 and 15 to an inoperative position where they no longer press against the picture, and the leaf springs are maintained in this inoperative position as long as the moving means 12 has the position of FIG. 1 so that these leaf springs do not resist the upward movement of a picture raised by the raising means 5 and so that the leaf springs only start to press against the picture after the moving means 12 moves to the left from the position thereof shown in FIG. 1.

The movement of the moving means 12 is brought about by a linkage means 18, 19, 20 composed of a link 18 connected with the moving means 12 by a pin and slot connection 25, 26. This link 18 is pivotal about a stationary pin 21 carried by the support means 1, and the link 18 is pivotally connected at 22 with one end of the link 19 which is pivotally connected at 23 with one end of the link 20 which is supported for pivotal movement at its end distant from the link 19 about a stationary pivot pin 24 carried by the support means 1.

An advancing means is provided for advancing the magazine step-by-step, after each picture is projected through a distance sufficient to locate the next picture in a position to be raised by the raising means 5, and this advancing means includes an alongated bar 28 supported by pin and slot connections 31, 31a for longitudinal movement to the right and left, as viewed in FIGS. 1 and 2, and cooperating at its left end with a lever 27 which is turnable about the stationary pivot pin 29 carried by the plate 1. The lever 27 is connected by a pin and slot connection 30 with the bar 28 to move the latter horizontally when the lever 27 turns about the pivot pin 29. Through a pin and slot connection 43, 44 the lever 28 is connected with a lever 32 which cooperates with a gear 33 for turning the latter through a predetermined angle each time the bar 28 is actuated by turning of the lever 27. This gear 33 cooperates with a rack 34 carried by the magazine so that each time the bar 28 is moved in one direction the gear 33 is turned by the lever 32 in order to advance the magazine 3 longitudinally through a distance sufficient to locate the next picture in a position to be projected. The lever 32 may be supported by the support means 1 for turning movement about a vertical axis and it may have a free springy end which cooperates with the teeth of the gear 33 for turning this gear when the lever 32 is turned in one direction and for yielding and riding over one or more teeth of the gear 33 when the lever 32 is turned in an opposite direction. In this way step by step advancing of the magazine 3 in one direction is provided.

Both of the above-described linkage means as well as the above-described advancing means are actuated from a single drive means which includes the disc 35 which is supported for turning movement about its axis by the support means 1. The turning axis of the disc 35 is normal to the plane of FIG. 1 and a manually operable lever 36 is fixed to the disc 35 for turning the latter. The disc 35 carries a pair of actuating pins 37 and 38 which turn with the disc.

When the handle 36 is turned in a counter-clockwise direction from the position of FIG. 1 to that of FIG. 2, so as to turn the disc 35 in a counter-clockwise direction, the pin 37 engages the top camming surface 11a of the cam 11 so as to turn the latter together with the linkage 6 in a counter-clockwise direction about the pivot pin 10, and in this way the initial part of the turning movement of the disc 35 causes the linkage 6 to raise the carriage 8 and the raising means 5 therewith so that the picture is raised. As soon as the pin 37 moves beyond the right end of the camming surface 11a at the top of the cam 11, the raising means 5 remains with its upper part at the elevation of the lower edge 2a of the projecting aperture 2, and the pin 37 now rides along the arcuate surface 11b of the cam 11, and the curvature of this arcuate surface is such that the cam 11 together with the linkage 6 remains in the position shown in FIG. 2 while the pin 37 rides along this arcuate surface 11b.

As the pin 37 turns together with the disc 35 in a counter-clockwise direction along the surface 11b, the pin 38 at the same time turns into the slot 39 of the lever 20 and turns the latter in a clockwise direction about the pivot pin 24 from the position of FIG. 1 to that of FIG. 2, so that the linkage means 18, 19, 20 is now moved from the position of FIG. 1 to that of FIG. 2 which causes the moving means 12 to be shifted to the left along the bar 13 from the position of FIG. 1 to that of FIG. 2. When the lever 36 has been turned through approximately 90° to its end position shown in FIG. 2, the moving means 12 has reached its left end position shown in FIG. 2. As was pointed out above, the raised picture moves into overlapping relation with the springs 14 and 15 which are held in an inoperative position by the pin 17. As soon as the moving means 12 moves through a slight distance to the left from the position shown in FIG. 1 the springs 14 and 15 are released and retain the picture between guide surfaces of the moving means 12 so that the picture is gripped by the moving means 12 during the continued movement thereof to the left from the position of FIG. 1 to that of FIG. 2.

In this way the picture has been moved to the picture-projecting position. When the lever 36 is returned from the position of FIG. 2 to that of FIG. 1, the first operation which takes place is the return of the linkage 18, 19, 20 from the position of FIG. 2 to that of FIG. 1 so that the moving means 12 is returned to the position of FIG. 1, and just before this moving means 12 reaches the position of FIG. 1 the pin 17 engages the frame which carries the leaf springs 14 and 15 to move the latter out of pressing engagement with the picture 4 which thus is released for falling back into the magazine as soon as the moving means 12 has returned to the position of FIG. 1. Of course the picture does not fall immediately into the magazine since its bottom edge is engaged by the raising means 5 which at this time is still in the raised position shown in FIG. 2. The continued turning of the lever 36 back toward the position of FIG. 1 causes the pin 37 to again become located at the position of FIG. 1 where it is above the camming surface 11a, and thus the carriage 8 together with the raising means 5 are free to move downwardly along the guiding bar 9 and the linkage 6 together with the cam 11 turn back to the position of FIG. 1. This action takes place either due to the weight of the parts 5, 6 and 8, or a suitable spring may be connected with the carriage 8 to urge the latter downwardly to the position of FIG. 1. In any event, the downward movement of the carriage 5 frees the picture 4 for falling movement back down into the magazine 3.

Just before the lever 36 reaches its starting position shown in FIG. 1, the camming surface 41 of the disc 35 engages the pin 16 carried by the lever 27 so as to turn this lever in a counter-clockwise direction about the pivot pin 29, and in this way the pin and slot connection 30 between lever 27 and bar 28 causes the latter to be shifted to the right, as viewed in FIGS. 1 and 2, with the result that the lever 32 is turned in that direction which turns the gear 33 for advancing the magazine 3 through a distance longitudinally which will locate the next picture in a position to be raised by the raising means 5. The raising means 5 is provided with a hardened roller 42 supported for turning movement about its axis at the upper left corner of the raising means 5, as viewed in FIGS. 1 and 2, so that when the picture is returned to the magazine by the moving means 12, the raising means 5 will not be injured by the sliding movement of a sharp edge of a glass transparency or the like, for example, along the raising means.

The above described structure can be connected with a projector.

FIG. 3 shows in perspective the structure for advancing the magazine 3 step by step along the guide means 40 so as to locate the row of pictures 4 carried by the magazine successively in a position to be acted upon by the raising means 5. In the position of the parts shown in FIG. 3, the edge 41 of the cam disc 35 has engaged pin 16 and turned the lever 27 in a counterclockwise direction about the pin 29 so as to shift, by way of the pin and slot connection 30, the bar 28 to the right, as viewed in FIG. 3. Thus, as is shown most clearly in FIGS. 4–6, the slot 44 of the bar 28 shifts to the right so that the pin 43 is shifted to turn the lever 32 which fixedly carries the pin 43. This lever 32 has the form of a bell crank and is pivotally supported by a pin which is fixed to and extends downwardly from a rib 1a integral with and extending across plate 1, this pivot pin carrying at its bottom end a nut or the like to maintain the lever 32 on the pin. The bell crank 32 is pivotally connected at its end distant from pin 43 by a pivot pin 45 to a pawl 46 whose free end 48 cooperates with the teeth of the gear 33. A wire spring 47 is coiled about the pin 45 and has free ends hooked around side deges of lever 32 and pawl 46 to urge the latter in a clockwise direction, as viewed in FIGS. 5 and 6, with respect to the lever 32.

At the end of the turning of the lever 36 to the position of FIG. 2 the edge 43' of the cam 35 engages the pin 16 to turn the lever 27 in a clockwise direction, as viewed in FIG. 3, so as to shift the lever 28 through pin and slot connection 30 to the left, as viewed in FIG. 3.

The bar 28 is shown in its right end position in FIG. 5 and in its left end position in FIG. 6. When the parts are in the position of FIG. 6, the pawl 46 engages a stop member 46' carried by the strip 1a, and this stop member limits the turning of the pawl 46 by the spring 47. When the bar 28 is shifted from the position of FIG. 6 to that of FIG. 5, by engagement of edge 41 of cam 35 with pin 16, the pawl 46 turns the gear 33 in a clockwise direction, as viewed in FIGS. 5 and 6, through an angle which locates the next picture 4 in a position to be engaged by the raising means 5. When the bar 28 is shifted from the position of FIG. 5 to that of FIG. 6 by engagement of edge 43' of cam 35 with pin 16 the lever 32 turns in a clockwise direction, as viewed in FIGS. 5 and 6, and the pawl 46 rides over a tooth of the gear 33 into the next gap, so that the parts again have the position shown in FIG. 6. In this way the magazine is moved in a stepwise manner.

The friction between the magazine 3 and the guide means 40 maintains the gear 33 stationary through cooperation of the gear 33 with the rack 34 fixed longitudinally to the left side of the magazine, as viewed in FIGS. 3–6. Moreover, a plate 50' which is fixed to the wall 1 and supports the gear 33 for rotation carries a pin 50 which fixed to the underside of the plate 50' a leaf spring 49 which urges a ball member 51 upwardly through an opening in the plate 50' into a gap between a pair of teeth of the pinion 33. This ball 51 also serves to maintain the pinion 33 stationary except when the lever 32 turns from the position of FIG. 6 to that of FIG. 5. At this time the turning of the pinion 33 forces the ball member 51 downwardly into engagement with the underside of the gear 33 until the ball member is moved into the next gap by the spring 49.

The pin and slot connection between lever 6 and element 8 is shown in FIG. 7 which illustrates the pin 7a carried by the lever 6 at its bottom end and the horizontal slot 7b of carriage 8 in which the pin 7a rides during turning of lever 6 and vertical movement of carriage 8. Actually, a pair of parallel pins 9 and tubes 8 slidable thereon and connected to each other are provided.

Referring to FIGS. 8–10, it will be seen that the moving means 12 includes a pair of forwardly extending ears 53 formed with aligned openings through which the bar 13 passes. The frame 52 integrally carries the leaf springs 14 and 15 and is located between the ears 53, this frame 52 itself including at its top end a pair of forwardly extending ears formed with aligned openings through which the bar 13 passes. The ears of frame 52 engage the ears 53, respectively, so that elements 12 and 52 are incapable of shifting laterally one with respect to the other and are constrained to move together along the bar 13. The cooperation of lever 18 with moving means 12 through pin and slot connection, 25, 26 prevents turning of element 12 about bar 13.

A leaf spring 55 carried by plate 52 engages plate 12 to urge the plate 52 and leaf springs 14 and 15 away from element 12 toward the plate 1.

The plate 52 integrally carries at its right edge, as viewed in FIG. 10, a curved tongue 56 which cooperates with the pin 17.

The legs 12a and 12b respectively have at their inner side edges forwardly directed extensions 54 between which the picture 4 is located with its side edges respectively guided by the extensions 54 for vertical movement, and the leaf springs 14 and 15 are also located between the extensions 54.

When the parts are in the position of FIG. 1, the pin 17 engages the frame 52 so as to locate the leaf springs 14 and 15 directly next to the plate 12 against the force of spring 55 at a distance from plate 1 greater than the thickness of picture 4, as shown in FIG. 9, so that the picture 4 can freely move up and down between the guides 54, the picture 4 sliding along the surface of plate 1 which is visible in FIGS. 1–3.

The movement of element 12 to the left causes the tongue 56 to leave the pin 17 so that the spring 55 turns frame 52 from the position of FIG. 9 to that of FIG. 8 and the leaf springs 14 and 15 now hold the picture 4 against the plate 1, the extensions 54 cooperating with the picture to shift it laterally with the moving means 12. Just before the moving means 12 again reaches the position of FIG. 1 the tongue 56 engages pin 17 to turn frame 52 from the position of FIG. 8 to that of FIG. 9 so that the picture which has just been projected is now free to return to the magazine while the parts of FIGS. 8–10 are ready to receive the next picture.

It will be understood that each of the elements described above, or two or more together, may also find a useful application in other types of photographic projectors differing from the types described above.

While the invention has been illustrated and described as embodied in a picture changing devices for photographic projectors, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic projector, in combination, support means; guide means carried by said support means for guiding a magazine for longitudinal movement; raising means carried by said support means for raising a picture from said magazine; moving means carried by said support means for receiving a picture raised by said raising means and for moving the same in a direction parallel to the plane of said picture to a picture-projecting position, said moving means also moving the picture back from the picture-projecting position to a position over the magazine where the moving means releases the picture for movement downwardly into the magazine and where the moving means is in a position to receive the next picture, second moving means including a leaf spring movable to and from a position resiliently gripping a picture carried by said moving means; a pin carried by said support means and located in the path of movement of said leaf spring when said moving means approaches said position where said moving means receives a picture raised by said raising means and where said moving means releases a picture returned from said picture-projecting position, said pin holding said leaf spring in an inoperative position where said leaf spring does not resiliently engage a picture as long as said moving means is in the region where it receives a picture raised by said raising means; and a single actuating means common to and operatively connected with said raising means and moving means for actuating said raising means and moving means.

2. In a photographic projector, in combination, support means; guide means carried by said support means for guiding a magazine for longitudinal movement; picture raising means carried by said support means for raising a picture from said magazine; moving means carried by said support means for moving a picture raised by said raising means in a direction parallel to the plane of said picture to a picture-projecting position; first linkage means cooperating with said raising means for raising the same; second linkage means cooperating with said moving means for moving the same; and a single drive means common to and operatively connected with said first and second linkage means for actuating both of said linkage means and for thus actuating both said raising means and said moving means.

3. In a photographic projector, in combination, support means; guide means carried by said support means for guiding a magazine for longitudinal movement; picture raising means carried by said support means for raising a picture from said magazine; moving means carried by said support means for moving a picture raised by said raising means in a direction parallel to the plane of said picture to a picture-projecting position; first linkage means cooperating with said raising means for raising the same; second linkage means cooperating with said moving means for moving the same; and a single drive means common to and operatively connected with said first and second linkage means for actuating both of said linkage means and for thus actuating both said raising means and said moving means, said drive means including a disc turnably supported by said support means and carrying a pair of pins which respectively cooperate with said first and second linkage means for actuating the latter during turning of said disc.

4. In a photographic projector, in combination, support means; guide means carried by said support means for guiding a magazine for longitudinal movement; raising means carried by said support means for raising a picture from said magazine; moving means carried by said support means for moving a picture raised by said raising means in a direction parallel to the plane of said picture to a picture-projecting position; first linkage means cooperating with said raising means for raising the same; second linkage means cooperating with said moving means for moving the same; a single drive means common to and operatively connected with said first and second linkage means for actuating both said raising means and said moving means; and advancing means cooperating with said guide means and carried by said support means for advancing a magazine guided by said guide means, said advancing means being operatively connected with said drive means to be operated thereby, said drive means including a disc turnably carried by said support means and having a pair of pins which respectively cooperate with said first and second linkage means for actuating the latter, said disc having a camming portion which cooperates with said advancing means for actuating the latter.

5. In a photographic projector, in combination, support means; guide means carried by said support means for guiding a magazine for longitudinal movement; picture raising means carried by said support means for raising a picture from a magazine guided by said guide means; moving means carried by said support means for moving a picture raised by said raising means in a direction parallel to the plane of said picture from said magazine to a picture-projecting position; first linkage means carried by said support means and cooperating with said raising means for actuating the same; second linkage means carried by said support means and cooperating with said moving means for actuating the same; a disc turnably supported by said support means and having a pair of pins which cooperate respectively with said first and second linkage means for actuating said first and second linkage means when said disc turns; and a manually operable lever connected with said disc for turning the same.

6. In a photographic projector, in combination, support means; guide means carried by said support means for guiding a magazine for longitudinal movement; raising means carried by said support means for raising a picture from a magazine guided by said guide means; moving means carried by said support means for moving a picture raised by said rasing means in a direction parallel to the plane of said picture from said magazine to a picture-projecting position; first linkage means carried by said support means and cooperating with said raising means for actuating the same; second linkage means carried by said support means and cooperating with said moving means for actuating the same; first and second cam means mounted respectively on said first and second linkage means; a disc turnably supported by said support means and having a pair of pins which cooperate respectively with said first and second cam means for actuating said first and second linkage means when said disc turns; and a manually operable lever connected with said disc for turning the same.

References Cited in the file of this patent
UNITED STATES PATENTS

| | | |
|---|---|---|
| 1,073,331 | Colardeau et al. | Sept. 16, 1913 |
| 2,840,941 | Badalich | July 1, 1958 |
| 2,878,604 | Mulch | Mar. 24, 1959 |